Aug. 11, 1959    E. M. ROTHERMEL    2,898,942
FLEXIBLE CONDUITS
Filed Nov. 25, 1957
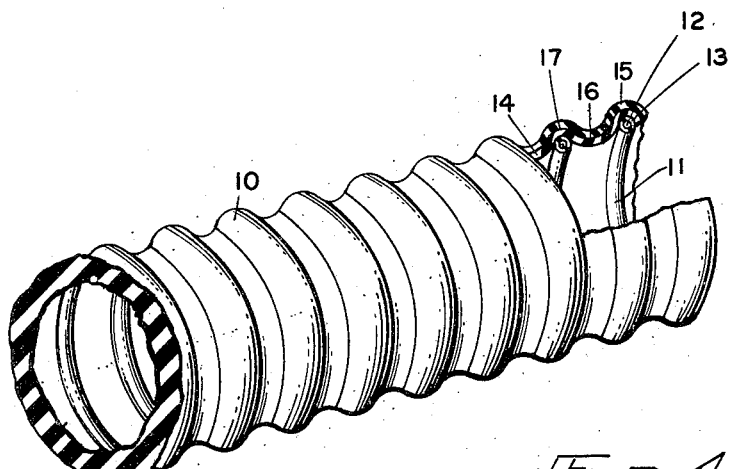
Fig 1
Fig 2
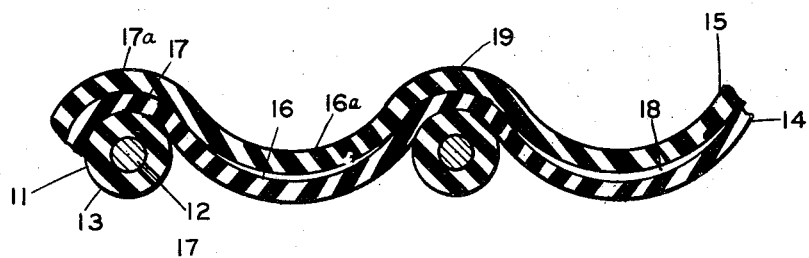
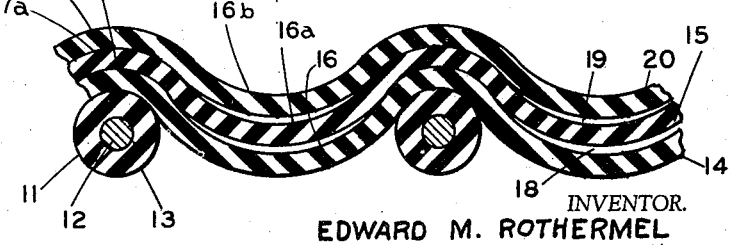
Fig 3
INVENTOR.
EDWARD M. ROTHERMEL
BY
Reuben Wolk
ATTORNEY

United States Patent Office 2,898,942
Patented Aug. 11, 1959

2,898,942

FLEXIBLE CONDUITS

Edward M. Rothermel, Waynesville, N.C., assignor to The Dayton Rubber Company, Dayton, Ohio, a corporation of Ohio Application November 25, 1957, Serial No. 698,730

10 Claims. (Cl. 138—56)

The present invention relates to flexible conduits and particularly to conduits which are suitable for the transmission of fluid such as air in the case of vacuum cleaners or water in the case of automotive cooling systems or the like.

In all of such conduits, fluid imperviousness is of course a primary consideration; and, in order to preserve this property, the conduit must have walls which will not break or tear when subjected to repeated flexing or vibration during use or when indented or abraded by external influences. At the same time, these conduits must be reinforced against radial and longitudinal stresses; and the reinforcement must be such that it will prevent collapse or restriction of the conduit passage.

In the prior art, it has been the practice to form such conduits of a rubber or plastic body having elastomeric properties and to reinforce this body with a steel or wire circumferential member which may also have longitudinal reinforcing effects. One such reinforcement popularly employed is a helical spring wire which has usually been embedded in the body but has more recently been positioned inwardly thereof.

While the prior art hoses, so constructed, have represented a substantial step forward, certain difficulties and problems have remained and have become accepted as unavoidable. For example, the very nature of a reinforcing member or coil of sufficient strength to serve its purpose, has exerted some strains and stresses upon the hose body; and the hose body, to resist these dominating influences of the reinforcing member, has had to be strengthened by increasing its thickness and forming it in the first instance of more durable compounds. In all cases however these expedients for strengthening the body have made it less flexible and considerably heavier with the result that the final hose is somewhat lacking in the desirable properties of extreme flexibility and light weight.

From the standpoint of economy of manufacture and to achieve a conduit of light weight and great flexibility for a given overall strength, it has recently been the practice to position the reinforcing member or coil interiorly of the tubular body. In such cases however, the above recited problems resulting from the use of a reinforcing member and the necessary changes in the tubular body to compensate for the same have been even more pronounced. Furthermore, even where a sufficiently durable, relatively thick tubular body is employed, the same has still been subject to being torn or ruptured with the complete and irreparable loss of fluid imperviousness.

It is accordingly an object of the present invention to provide an improved conduit for fluid transmission.

It is a further object of the present invention to provide such a conduit which will be light in weight and extremely flexible.

It is still a further object of the present invention to provide a flexible, fluid impervious conduit wherein the tubular conduit body will be of sufficient strength and thickness to overcome the wearing and straining influences of the reinforcement positioned therewithin but will still make a flexible, lightweight hose possible.

Still a further object of the present invention is to provide a flexible, lightweight, fluid impervious conduit which will resist any breaking or tearing of the conduit wall even though such wall is outwardly of the reinforcing member thereby incurring the advantages which are otherwise available in conduits so constructed.

It is still a further object of the present invention to provide such a conduit wherein any break or tear in the conduit wall will not necessarily result in an immediate loss of fluid imperviousness and may be repaired before such loss is suffered.

To achieve these and other objects and advantages of the present invention which will be apparent from a reading of the following disclosure, it is proposed to provide a conduit body wherein the tubular wall portion is positioned outwardly of the reinforcing member but consists of two or more thicknesses or tubular layers in the form of separate and distinct sheaths, each of which has its own particular relationship to the reinforcing member and to the hose assembly generally.

The reinforcing member according to the present invention may be in the form of any of the circumferential reinforcements commonly employed for flexible conduit bodies such as a helical coil spring or similar generally cylindrical alignments of axially spaced circumferential turns or units. These units may have a center or core of a strength-giving material such as spring steel wire or the like and be coated or otherwise provided with an exterior surface of a plastic material. About this circumferential reinforcing member is positioned a first elastomeric sheath or tube which elastically embraces the member and exerts a radially inward elastic force against the radially outward support or resilient counterforce provided by the coil or spring. In addition to elastically embracing the reinforcement, this first tube or sheath is adhered, bonded, fused or otherwise directly and integrally associated with the plastic surface thereof. This first tube is also pleated or corrugated; that is, characterized by alternating crests and troughs longitudinally of the tubular body, with the crests passing over and the troughs spaced between the individual turns of the circumferential reinforcement. In this manner, this first sheath may be said to at least partially embrace each of the individual turns of the reinforcement; and the corrugation may result solely from the fact that the sheath is elastically embracing the reinforcement, in that, where the tube is not held against further elastic constriction by the reinforcement, it will pull itself inwardly between the individual, axially spaced turns thereof. The corrugation may however be accentuated or increased as to the depth or height of the troughs and crests by placing the reinforcing member in a distended or elongated condition before the elastomeric tube is applied thereto. It has in fact been found desirable in many applications to pre-stretch the previously formed spring or coil prior to associating the first tubular member therewith so that the tubular member itself will serve to hold the reinforcing member in slightly axially elongated or tensed condition. This condition can be maintained in the finished conduit where the force of the elasticity of the inwardly contracting hose is greater than the radially expansive force of the coil member as the latter seeks to return to its length at the time it was initially formed.

The second tubular member is positioned outwardly of the first tubular member about the reinforcement, but because of the interposition of the first tubular member, this second member has no contact with the wire turns other than the fact that it will conform in general shape to the corrugated pattern of the first tube and will thereby itself partially surround the individual turns of the reinforcement. While this second tubular member surrounds and elastically embraces the assembly of the reinforcement and first tubular member as above described, the second member is in direct contact with the first tubular member only at the crests of its corrugations. Otherwise, the second tubular member is spaced from the first tubular member by a small distance thereby defining between the two tubular members a narrow air space at least along the troughs of the corrugated body. There is no fusion, adhesion or other affixation of the second tube to the first tubular member other than the mere frictional engagement resulting from the fact that the second member does elastically embrace the inner assembly. Because of this complete absence of any direct and positive association between the two tubes, they are axially slidable relative to each other; and such sliding motion, at least in the troughs of the corrugations, does take place when the hose is subjected to flexure.

For certain uses, it may be desirable to utilize a total of three, four or even more tubular members in making the assembly. In such an assembly, the third member has the same relation to the first member as has been described with respect to the first and second members; namely, the lack of direct contact between these second and third members except at the crests of the corrugations. This relationship is repeated with each succeeding adjacent member. Thus there is created additional air spaces of small dimension along the troughs of the members, and no adhesion is involved beyond the frictional engagement at the crests. It is obvious that as many tubular members as desired may be added. An excessive build-up of overall thickness may be prevented by reducing the thickness of the members in order to maintain a desired flexibility.

By virtue of the above-described distinctness and relative independence of the adjacent tubular members forming the hose or conduit wall, it has developed that the wall itself is much more resistant to being punctured or torn completely through, since any tearing force or instrument will encounter only the outer tube which may itself be torn without resulting in any loss of the imperviousness to the overall hose. At the same time, the small air spaces between each of the adjacent layers act as a cushion and as further protection against any rupture through the tubes. In view of this protection against rupture or tearing afforded by the multiple separate tubular wall members and the small air space therebetween, it is now possible to construct a hose which will have satisfactory resistance to tearing and other damaging influences either from the reinforcement or from external sources without resorting to a hose wall of excessive thickness, weight or rigidity. It is also possible to position the entire wall outwardly of the reinforcement thereby achieving greater flexibility and economy without risking the premature failure previously experienced in hoses so constructed.

The invention thus generally described may be more clearly understood by reference to the following detailed description of certain preferred embodiments thereof in connection with which reference may be had to the appended drawings.

In the drawings:

Figure 1 is a perspective view, partially broken away and in partial cross section, illustrating one form of conduit according to the present invention.

Figure 2 is an enlarged cross section through the wall and reinforcement of the conduit illustrated in Figure 1.

Figure 3 is a view similar to Figure 2 illustrating a modified form of the invention.

Referring now to Figure 1, the conduit generally is shown to consist of a body 10, founded upon an inwardly disposed reinforcing member 11 which may consist of a generally cylindrical alignment of axially spaced circumferential turns and which, in the case of the preferred embodiment shown is a helix or wire coil of spring steel wire 12 having a coating or surface 13 of an elastomeric plastic material such as a polyvinyl chloride composition. Encircling and elastically embracing this reinforcement is a first tubular layer or sheath 14 which likewise is preferably composed of an elastomeric plastic material such as polyvinyl chloride. Then outwardly of this first tube 14 is a second tubular layer or sheath sometimes referred to as a cover 15, which, once again, is preferably composed of an elastomeric plastic material.

Where the circumferential reinforcement to be employed in the hose body is a coil or helix such as that shown at 11 in Figure 1, the same is preferably formed by first passing a spring steel or like strand through a coating extruder which applies the plastic coating 13 or otherwise imparts a plastic surface to the strand. The wire thus coated is then spun or otherwise formed by means well known to the art into a spring or coil wherein the individual turns or helices are axially spaced by the approximate distance desired for the spacing of these helices in the finished hose. For example, where a finished hose having an inside diameter of one and one-half inches with a longitudinl spacing of the individual helices of one-fourth of an inch is desired, the wire 12 with the coating 13 thereon is spun into a coil having an inside diameter of one and one-half inches and the individual helices spaced by one fourth of an inch.

The first or innermost tube or sheath 14 is then formed by extrusion or other processes well known to the art to have an inside diameter of say one and one-fourth inches. Where the inside diameter of the wire coil is one and one-half inches as stated above and the wire with its coating is on the order of .081 inch in diameter, it can be appreciated that the outside diameter of the coil will be approximately 1.662 or one and two-thirds inches. Thus it can be seen that the inside diameter of the inner tube 14 is considerably less than the outside diameter of the coil, and the tube will have to be expanded or the coil reduced in diameter in order to get the tube around the coil. This expansion of the tube may be conveniently accomplished by placing the same in a conventional vacuum expander box which is merely a hollow tubular structure within which the tube 14 may be positioned and "cuffed" or slipped back over the edges of the structure so as to effect a seal between the outer surface of the tubular component 14 and the inner surface of the vacuum box. This space is then evacuated by well known means such as a vacuum pump connected to the space by simple fittings, so that the ambient or atmospheric pressure will cause the tubular member 14 to expand to a larger diameter. Once the tubular member is so expanded, the wire coil may be easily inserted therein whereupon the vacuum may be released and the member 14, which at all times must be kept within its elastic limit, will strive to return to its originally extruded diameter and in so doing will elastically embrace the coil. The nature of this elastic engagement between the tube and the wire coil is such that the tube will tend to collapse radially inwardly at points between the individual wire turns and to form troughs or valleys 16; while those portions of the tube opposite the individual helices will be held in a radially outward position to form the crests or peaks 17. The alternating valleys 16 and peaks 17 thus formed will result in an overall corrugated configuration of the tubular layer 14 as it is supported by the reinforcement 11. Another adjunct of this elastic engagement of the tube 14 about the reinforcement is that as the tube seeks to collapse radially inwardly, it will tend to pull the individual turns of the reinforcement closer together longitudinally. It is for this reason that, before the tube is applied, the coil should be elongated to such an extent that, after the elasticity of the tube and the resilience of the coil are in balance and the two components are at rest and in contact with each other the individual turns of the coil will be spaced by approximately the same distance as that in which they were originally formed. Although the turns are said to return to their approximate original spacing, it has been found desirable in many instances that they should not completely return to such spacing so that in effect the coil or the wire of which the coil is formed will be under slight tension, and any longitudinal forces applied to the complete hose will be absorbed at least in part by the action of the spring rather than solely by the tubular body members. Thus if a finished hose of say eight and one-half feet in length having its individual turns spaced longitudinally by approximately one-fourth of an inch is desired, the coil should be formed with such spacing and in a length of slightly less than eight and one-half feet in the first instance. Prior to the application of the tubular sheath 14 thereto however the coil should be stretched to approximately 10 feet in length so that, as the tube is released upon the coil and the coil is in turn allowed to seek its normal length, the coil will shorten to approximately eight and one-half feet with the individual turns being spaced slightly more than one-fourth of an inch.

At this point in the manufacture of conduits according to the present invention is has been found desirable in certain modifications to effect some fixation or integration between the plastic surface of the wire coil and the inner surface of the tubular member 14. In the case of the plastic coated spring steel wire shown in Figure 1, it has been found that this adhesion may be conveniently obtained by passing an electric current through the wire so that the heat resulting from the the resistance to the passage of this current will melt the plastic material of the coating 13 so it will fuse or become welded to the tube at points where the tube and coil are in contact. Where, as stated above, the plastic surface of the wire reinforcement and the plastic tubular layer are composed of a plasticized polyvinyl chloride compound, it has been found that satisfactory fusion or integration of the coil and the tube may be effected by passing a 220-volt current through the coil 12 of the coil for ten seconds where the core is a spring steel wire of approximately .051 inch in diameter, and forms a fifteen-foot, one and one-half inch inside diameter coil having the turns longitudinally spaced by approximately one-fourth inch. In hoses of the same length and coil spacing but having a one and one-quarter inch inside diameter and employing a spring steel wire of .045 inch in diameter, the 220 volts should pass through the coil for eight seconds. In a hose of the same length and coil spacing but having a one and three-quarter inch inside diameter and employing a .058 inch diameter spring steel wire, the 220 volt current should pass through the same for 12 seconds. Where the plastic coating 13 of the core 12 is on the order of .015 inch in thickness a firm integration between the coating and the sheath 14 has been effected along all points at which the sheath is in firm contact with the coil at the crests 17 thereof.

About the conduit body thus far constructed, is then positioned the second or outer tubular layer or sheath 15 which also is formed in the first instance, like the tubular layer 14, by extrusion or otherwise to be a tube having an inside diameter of approximately one and one-fourth inches. In view of this relatively small diameter of the second tubular member, it also must be expanded as for example by use of the above described vacuum box before it can be applied to the hose assembly. Once this tube is so expanded, the reinforcing coil 11 with the first tubular sheath 14 positioned thereon, elastically embracing the same, and/or adhered thereto, is positioned within the expanded outer tubular layer 15 which is then released from the expansive influence and allowed to contract upon the assembly. Since this second tubular layer will, like the first, also tend to elastically embrace the assembly, it will also assume a corrugated configuration consisting of crests or peaks 17a at points on the hose opposite the position of the wire turns and the troughs or valleys 16a positioned therebetween. Similarly, the influence of the second tubular member will be to cause the previously assembled coil and inner tubular layer 14 to shrink axially; and for this reason, this pre-assembly of the tube 14 and reinforcement 11 should be stretched again to approximately 10 feet in the case of the hose of the dimensions above described so that the second tube will cause the entire assembly to shrink back to the desired eight and one-half foot hose.

A significant and important feature of the present invention however is that there is no direct association other than the above described elastically embracing relationship between the outer tubular layer 15 and the innner layer 14, so that the outer layer 15 may be slidable relative to the inner tube 14. Moreover, the collapse of the outer tubular layer 15 upon the pre-assembly consisting of the coil 11 and the inner tube 14 will trap air between the two tubular layers as they come togther with the result that this second tubular layer 15 will be spaced from the first layer 14 by a narrow air space 18 which will approximate a thickness of from one sixty-fourth to one thirty-second of an inch between the troughs 16 and 16a. In most cases the outer tubular layer 15 will contact the inner tubular layer 14 at the crests 17 of the corrugation of the latter but the layer 15 will span the troughs 16 so that there will be a space varying from nothing at the crest 17a to a maximum of about one thirty-second to one sixty-fourth of an inch between the centers of the troughs 16 and 16a as shown in Figure 2. It is this air space or pocket between the two tubular layers which at once enhances the flexibility of the hose assembly and protects the body thereof from being torn or punctured either by the reaction between the hose walls and the coil thereof or by damage from external influences.

Turning now to Figure 3, an additional embodiment is shown illustrating the use of three tubes instead of two. This form of the invention may be desired where additional flexibility is necessary. The conduit consists of the same reinforcing member 11, the same first tubular layer or sheath 14, and the same second layer or sheath 15, assembled as previously described. In this form, however, a third layer 20 encircles and elastically embraces the layer 15 in the same relationship that layer 15 has to layer 14, and is made in the same manner as layer 15 as previously described. After the layer 15 has been assembled on 14, the third layer 20 is expanded by use of the vacuum box previously used for expanding layer 15. The assembly consisting of reinforcing coil 11, first tubular layer 14, and second tubular layer 15, is positioned within the layer 20, which is released from the influence of the vacuum box and allowed to contract upon the assembly. Just as the layer 15 embraces 14, so will layer 20 embrace 14 and follow the existing corrugations to create crests or peaks 17b and valleys or troughs 16b corresponding to crests 17 and 17a and valleys 16 and 16b of the inner two layers. The outer layer 20 is slidable relative to tube 15.

Just as occurred between layers 14 and 15, the collapse of layer 20 on layer 15 will trap air between these layers so that an air space 19 of about one sixty-fourth to one thirty-second of an inch will exist between the troughs 16a and 16b. The crests 17a and 17b will be in contact. The air space 19 enhances the flexibility of the hose just as did air space 18, by permitting a relative sliding and flexing action between layers to aid the normal flexing due to the basic construction. If desired, additional tubular layers may envelop the assembly for added strength or flexibility.

Reference in the foregoing disclosure to plastic or elastomeric plastic materials is meant to include any of the well-known natural or synthetic materials having elastomeric properties at room temperatures and includes rubber, the various synthetic rubbers, such as the butadiene-styrene or the butadiene-acrylonitrile copolymers, the polychloroprenes, the polysulphides, and the various elastomeric organic plastic materials such as the polyamides, polyethylene, polyvinyl acetate, vinylidene chloride, the polyurethanes and the like.

While the foregoing invention has been described in considerable detail in connection with certain preferred embodiments thereof, it is to be understood that this particularization and detail have been for the purposes of illustration only and in no way limit the scope of the invention as it is defined in the subjoined claims.

I claim:

1. A flexible, fluid-impervious conduit comprising a helical spring of plastic coated wire, a first elastomeric sheath surrounding and elastically embracing said spring and a second elastomeric sheath surrounding and coextensive with said first sheath, said second sheath in partial elastically embracing contact with the first sheath and otherwise closely spaced therefrom.

2. A flexible, fluid-imprevious conduit comprising a helical spring of plastic coated wire, a first elastomeric sheath surrounding and elastically embracing said spring, and a second elastomeric sheath surrounding and coextensive with said first sheath, said sheaths defining a narrow air space between certain corresponding portions thereof.

3. A flexible, fluid-impervious conduit comprising an inwardly disposed reinforcing member consisting of a plastic coated wire having axially spaced circumferential turns, a circumferentially tensioned first elastomeric sheath surrounding and adhered at least to the outer periphery of said turns, and a second elastomeric sheath surrounding and in partial contact with said first sheath.

4. A conduit according to claim 3 wherein said second sheath contacts said first sheath only at points which are axially opposite said turns.

5. A flexible, fluid-impervious conduit comprising a plastic coated helical wire coil, a first elastomeric plastic sheath elastically embracing said coil and fused with and partially surrounding the outer periphery of the individual turns thereof, and a second elastomeric plastic sheath elastically embracing the assembly of said coil and said first sheath but being axially slidable relative to the latter.

6. A flexible, fluid-impervious conduit comprising a plastic coated helical wire coil having a plurality of axially spaced turns, a corrugated tube of elastomeric material enveloping said coil and partially surrounding said turns, the crests of the corrugated tube overlying said helices and the troughs of the tube being spaced therebetween, and an elastomeric sheath surrounding the assembly of said coil and said tube and elastically embracing the latter along the crests of its corrugations and spaced from the troughs thereof.

7. A flexible, fluid-impervious conduit comprising a helical spring of plastic coated wire, a first elastomeric sheath surrounding and elastically embracing said spring and at least one additional elastomeric sheath surrounding said spring and said first sheath, each of said additional sheaths in embracing contact with its next inner sheath at certain points and spaced from its next inner sheath at certain other points.

8. A flexible, fluid-impervious conduit comprising a plastic coated helical wire coil, a first elastomeric plastic sheath elastically embracing said coil and fused with and partially surrounding the outer periphery of the individual turns thereof, and at least one additional elastomeric plastic sheath enveloping said first sheath and coil, each of said additional sheaths axially slidable with respect to its adjacent sheaths.

9. A flexible, fluid-impervious conduit comprising a helical spring of plastic coated wire, a first elastomeric sheath surrounding and elastically embracing said spring, and at least one additional elastomeric sheath surrounding said first sheath, each of said additional sheaths defining a narrow air space between certain corresponding portions of the next inner sheath.

10. A flexible, fluid-impervious conduit comprising a plastic coated helical wire coil, a first elastomeric plastic sheath elastically embracing said coil and bonded to and partially surrounding the outer periphery of the individual turns thereof, and at least one additional elastomeric plastic sheath enveloping said first sheath and coil, each of said additional sheaths axially slidable with respect to its adjacent sheaths.

References Cited in the file of this patent

UNITED STATES PATENTS

| | | |
|---|---|---|
| 1,937,069 | Rado | Nov. 28, 1933 |
| 2,739,616 | Duff | Mar. 27, 1956 |